US009409320B2

(12) United States Patent
Schultheiss et al.

(10) Patent No.: US 9,409,320 B2
(45) Date of Patent: Aug. 9, 2016

(54) COLLAPSIBLE MANDREL FOR MANUFACTURING THREE-DIMENSIONAL STRUCTURES

(71) Applicant: GENERAL ELECTRIC COMPANY, Schenectady, NY (US)

(72) Inventors: David Schultheiss, Munich (DE); Swen Zaremba, Munich (DE); Christoph Ebel, Munich (DE)

(73) Assignee: General Electric Company, Niskayuna, NY (US)

( * ) Notice: Subject to any disclaimer, the term of this patent is extended or adjusted under 35 U.S.C. 154(b) by 691 days.

(21) Appl. No.: 13/718,176

(22) Filed: Dec. 18, 2012

(65) Prior Publication Data

US 2014/0167319 A1 Jun. 19, 2014

(51) Int. Cl.
*B29C 33/44* (2006.01)
*B29C 33/48* (2006.01)
*B29C 33/54* (2006.01)

(52) U.S. Cl.
CPC ............ *B29C 33/448* (2013.01); *B29C 33/485* (2013.01); *B29C 33/54* (2013.01); *B29K 2995/0012* (2013.01)

(58) Field of Classification Search
CPC ...... B29C 33/448; B29C 33/485; B29C 33/54
See application file for complete search history.

(56) References Cited

U.S. PATENT DOCUMENTS

| 5,282,734 | A | | 2/1994 | Pastureau et al. |
| 5,817,269 | A | * | 10/1998 | Younie ............... B29C 33/38 249/82 |
| 7,588,655 | B2 | * | 9/2009 | Pham .................. B29C 43/12 156/227 |
| 2009/0130442 | A1 | * | 5/2009 | Christ ................ C01B 31/0423 428/367 |
| 2011/0304067 | A1 | | 12/2011 | Rossfeldt et al. |
| 2012/0228467 | A1 | | 9/2012 | Wallen et al. |

FOREIGN PATENT DOCUMENTS

JP S5868446 A * 4/1983 ............... B22C 1/02

OTHER PUBLICATIONS

Kishi, et al; "Dismantlable Epoxy Adhesives for Recycling of Structural Materials," 16th International Conference on Composite Materials, ICCM-16—"A Giant Step Towards Environmental Awareness: From Green Composites to Aerospace:" Kyoto; Jul. 8, 2007 through Jul. 13, 2007.

Gardos, et al; "Solid Lubricated Turbine Bearings: Part I—Preparation of 316 degree C Lubricative Composites and Separators," ASLE Special Publication 1984, pp. 248-257, ASLE Proceedings—3rd International Conference on Solid Lubrication.

(Continued)

*Primary Examiner* — James Sanders
(74) *Attorney, Agent, or Firm* — John P. Darling

(57) ABSTRACT

A mandrel for manufacturing a three-dimensional structure from a composite material. The external surface of the mandrel can at least partially correspond to the inner surface of the three-dimensional structure. The mandrel can include a plurality of expandable particles configured to increase responsive to a threshold condition. The mandrel can be configured to crack responsive to a triggering condition.

20 Claims, 4 Drawing Sheets

(56) References Cited

OTHER PUBLICATIONS

Kishi, et al; "Dismantlable Epoxy Adhesives for Recycling of Structural Materials," 16th International Conference on Composite Materials, ICCM-16—"A Giant Step Towards Environmental Awareness: From Green Composites to Aerospace;" Kyoto; Jul. 8, 2007 through Jul. 13, 2007.

Wallen, et al; "Advanced Manufacturing Technology for Aerospace Composites," 24th Annual Technical Conference of the American Society for Composites 2009 and 1st Joint Canadian-American Technical Conference on Composites, 2009, vol. 1, pp. 575-582.

* cited by examiner

COLLAPSIBLE MANDREL FOR MANUFACTURING THREE-DIMENSIONAL STRUCTURES

FIELD OF THE INVENTION

The subject matter disclosed herein is related generally to manufacturing three-dimensional structures from composite materials and specifically to a mandrel employed in manufacturing three-dimensional structures from composite materials.

BACKGROUND

Due to shortage of fossil fuels and banning nuclear power production in several countries, the manufacturing industries are augmenting their efforts to develop energy-saving processes and products. On the other hand, as the environment protection has become a paramount priority for many countries, environmentally rooted constraints, such as carbon dioxide emission levels, have been imposed on numerous processes and products. Reduction of weight of parts and structures can be an effective answer to both above identified challenges. For example, in the automotive industry, with the advent of electrically powered and hybrid vehicles, the weight of the vehicle has become a critical design point, since the weight of an electrical battery employed to accumulate the energy needed to drive the powertrain considerably exceeds the weight of the gasoline that would have been needed to accomplish the same task by employing an internal combustion engine. In another example, reduction of carbon dioxide emissions by an aircraft can be achieved by reducing the fuel consumption by the aircraft, which in turn can be achieved by reducing the aircraft weight.

Weight reduction in motor vehicle manufacturing, aircraft manufacturing and other industries can be achieved, inter alia, by the substituting metal structures with structures manufactured of composite materials, e.g., carbon fiber reinforced plastic (CFRP). CFRP structures can be up to 50% lighter than similar parts manufactured of steel and up to 30% lighter than similar component manufactured of aluminum.

There are many techniques available for manufacturing composite parts or structures, including, e.g., wrapping, molding and/or laying-up various combinations of fiber-based materials and resins. Various shapes of composite components can be achieved using shells and mandrels of various configurations. Removing the mandrel can present a process design challenge in situations when the component being manufactured is a three-dimensional structure having one or more recesses or protrusions.

SUMMARY

In one embodiment, there is provided a mandrel for manufacturing a three-dimensional structure from a composite material. At least one surface of the mandrel can at least partially correspond to at least one surface of the three-dimensional structure. The mandrel can comprise a plurality of expandable particles configured to increase responsive to a threshold condition. The mandrel can be configured to crack responsive to a triggering condition.

In another embodiment, there is provided a method of manufacturing a three-dimensional structure from a composite material. The method can comprise: providing a mandrel having at least on surface at least partially corresponding to the at least one desired surface of the three-dimensional structure, the mandrel including a plurality of expandable particles configured to increase responsive to a threshold condition; forming the three-dimensional structure by depositing the composite material around the mandrel; cracking the mandrel inside the three-dimensional structure by causing a triggering condition; and removing at least a portion of the mandrel from the three-dimensional structure.

BRIEF DESCRIPTION OF THE FIGURES

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION

In a process of manufacturing a three-dimensional structure from a composite material, the three-dimensional structure can be formed by depositing the composite material between a mandrel defining the inner surface of the three-dimensional structure being manufactured and an outer shell defining the outer surface of the three-dimensional structure being manufactured. "Mandrel" herein shall mean an object employed to facilitate shaping of a three-dimensional structure. Examples of mandrels include, without limitation, arbors, dies, bars, or spindles of various shapes and compositions.

Upon completing the above described step of forming of a three-dimensional structure, the composite material can be cured, e.g., at a relatively high temperature for a period of time. Finally, the outer shell and the mandrel can be removed.

Figure 1:
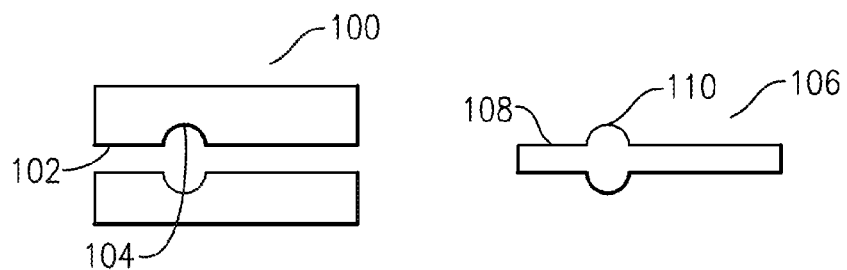
FIGS. 1-2 schematically illustrate three-dimensional structures and mandrels employed in their fabrication.
Figure 2:
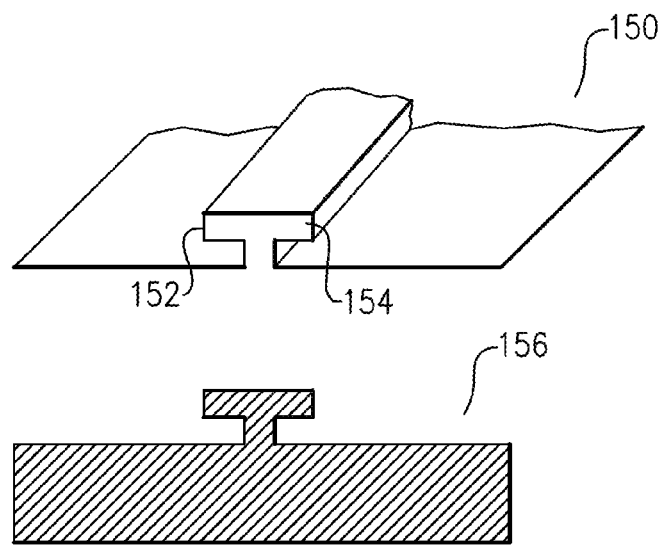

As noted herein above, removing the mandrel can present a process design challenge in situations when the component being manufactured is a structure having one or more recesses and/or protrusions on its internal and/or external surface, as schematically illustrated by FIGS. 1-2. FIG. 1 depicts a rotationally symmetrical three-dimensional structure 100 having an internal surface 102 with a recess 104. Mandrel 106 employed in manufacturing of structure 100 has an external surface 108 at least partially corresponding to internal surface 102 of structure 100, including a protrusion 110 corresponding to recess 104. The presence of protrusion 110 would make removal of mandrel 106 from structure 100 virtually impossible without at least partially deforming mandrel 106. FIG. 2 schematically illustrates a three-dimensional structure 150 having protrusions 152 and 154 and a mandrel 156 employed in its fabrication.

Removable mandrels known in the art include, e.g., water-collapsible mandrels made of sand or ceramic particles connected by means of a water-soluble substance and mandrels made of alloys having a low melting point. High cost, low maximum working temperature and/or poor mechanical properties of such mandrels (e.g., compressive strength, impact resistance, density, flexural strength, etc.) can severely limit their possible applications.

Figure 3:
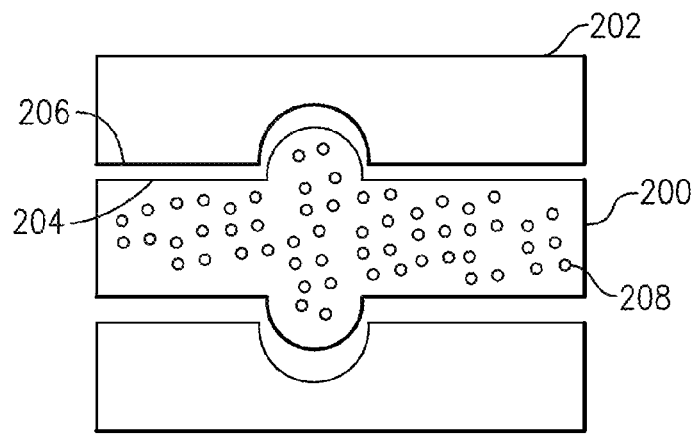
FIG. 3 schematically illustrates a collapsible mandrel for manufacturing a three-dimensional structure from a composite material, in accordance with one or more aspects of this disclosure.

Hence, in one aspect, there is provided a mandrel 200 schematically illustrated by FIG. 3, for manufacturing a three-dimensional structure 202 from a composite material. Mandrel 200 can have an external surface 204 at least partially corresponding to an inner surface 206 of the three-dimensional structure 202. The mandrel can be made from a material that would provide the desired working temperature range, mechanical properties (e.g., compressive strength, impact resistance, flexural strength), and surface quality of the mandrel (such as surface roughness and dimensional stability). In one illustrative example, the mandrel can be made from gypsum plaster. Other possible materials include, for example, hollow ceramics with a binder, sand with a binder, cement, salt, polyurethane foam, etc. In order to facilitate the mandrel removal from a cured three-dimensional structure, the material employed in manufacturing the mandrel can comprise an additive designed to cause mechanical destruction of the mandrel responsive to a triggering condition.

In certain embodiments, the additive can be provided by a plurality of expandable particles 208 made from a material having a variable coefficient of thermal expansion (CTE), such that the CTE can substantially increase responsive to a triggering condition. Hence, by producing the triggering condition, the plurality of expandable particles can be caused to spatially expand, thus in turn causing mechanical destruction of the mandrel.

In one illustrative example, the triggering condition can be provided, e.g., by increasing the temperature of the mandrel above a threshold temperature level, so that heating the mandrel above a threshold temperature would cause substantial increase of the CTE of the expandable particle material, which in turn would produce their spatial expansion and ensuing mechanical destruction of the mandrel.

In certain embodiments, the CTE of the expandable particle material can be below a lower threshold value in the absence of the triggering condition, and can raise above an upper threshold value responsive to the triggering condition. In one illustrative example, the CTE of the expandable particle material can be below $25*10^{-6} K^{-1}$ until the temperature reaches a triggering value, thereby causing the CTE to raise above $30*10^{-6} K^{-1}$.

In certain embodiments, the temperature triggering destruction of mandrel can be designed to exceed the maximum working temperature needed for curing the composite material of which the three-dimensional structure is being manufactured.

Figure 4:
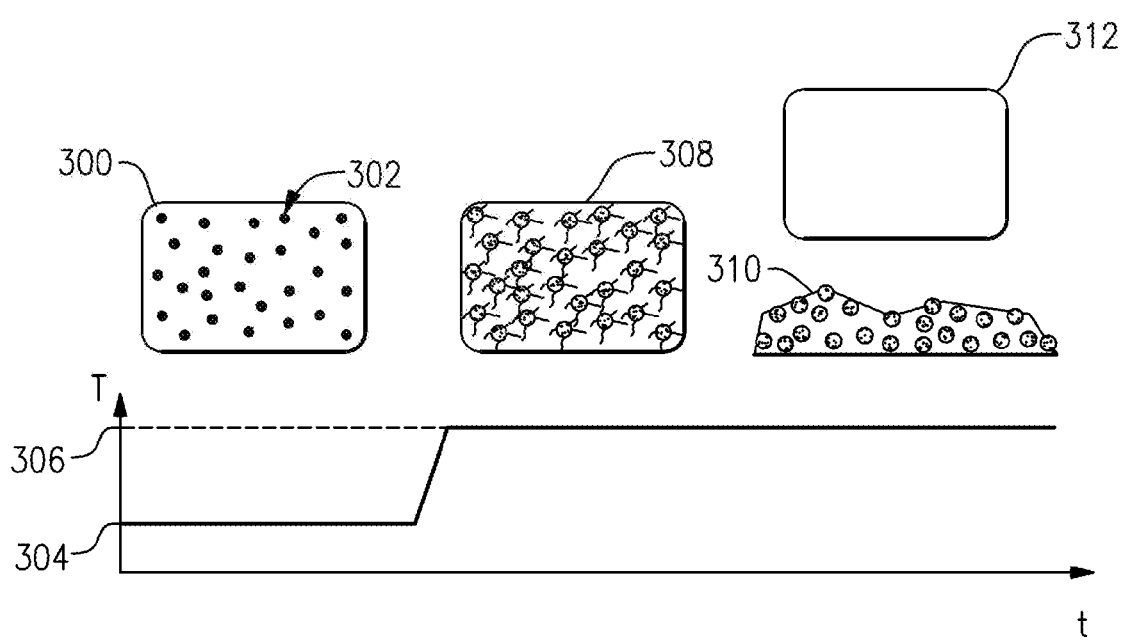
FIG. 4 schematically illustrates the process of destruction of a mandrel made of a material containing an expandable additive, in accordance with one or more aspects of this disclosure.

FIG. 4 schematically illustrates the process of destruction of a mandrel made of a material containing an expandable additive according to one or more aspects of the present disclosure. A fragment of mandrel 300 made of a material containing a plurality of thermally expandable particles 302 demonstrates the desired mechanical properties and surface quality at the working temperature 304 needed for curing the composite material of which the three-dimensional structure is being manufactured. As a final step of the curing process, the temperature can be raised to the value exceeding or equal to the threshold value 306 thus causing spatial expansion of the expandable particles and ensuing mechanical destruction of the mandrel, as schematically illustrated by the mandrel fragment 308. The mandrel fragments 310 can be removed from the three-dimensional structure 312.

In one illustrative embodiment, the expandable additive can be provided by a plurality of particles of expandable graphite. The expandable graphite expands as a result of a chemical reaction which starts at a triggering temperature.

Figure 5:
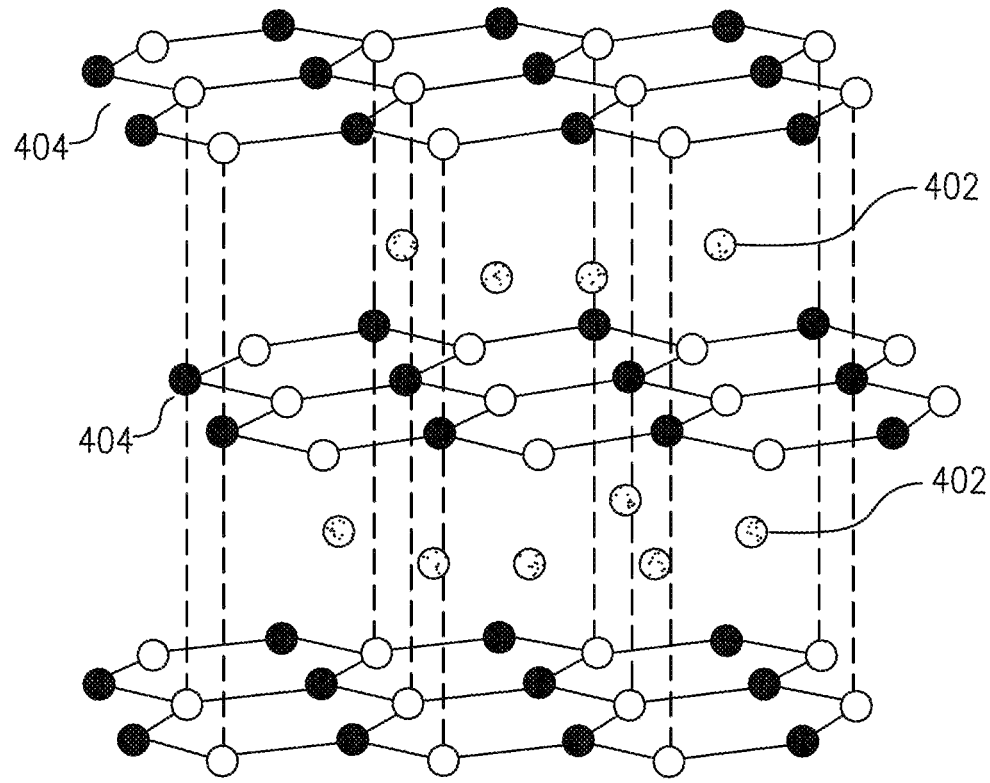
FIG. 5 schematically illustrates the atomic-level structure of expandable graphite.

Expandable graphite or Graphite Intercalation Compound (GIC) is a form of graphite that has been modified by incorporating atoms or molecules between the carbon layers, by the process called "intercalation," as schematically illustrated by FIG. 5. Molecules 402 embedded between the carbon layers 404 can include sulfur or nitrogen compounds. High-grade expandable graphite varieties usually have a greater proportion of intercalated layers. After reaching a certain temperature, the graphite layers are driven apart by thermolysis. The expansion takes place almost instantaneously the final volume can be several hundred times greater than the initial volume. Properties of expandable graphite, e.g., the initial expansion temperature and degree of expansion, are primarily defined by the quality of intercalation (proportion of intercalated layers) and by the intercalation agent.

As noted herein above, in one illustrative example, the mandrel can be made of a material comprising gypsum plaster (calcium sulfate, $CaSO_4$) and expandable graphite. A plurality of expandable graphite particles incorporated into the plaster can spatially expand at a certain temperature. The resulting micro cracks can lead to disintegration of the mandrel into multiple small fragments, which can be removed through openings in the three-dimensional structure being manufactured, for example, using low pressure water.

Figure 6:
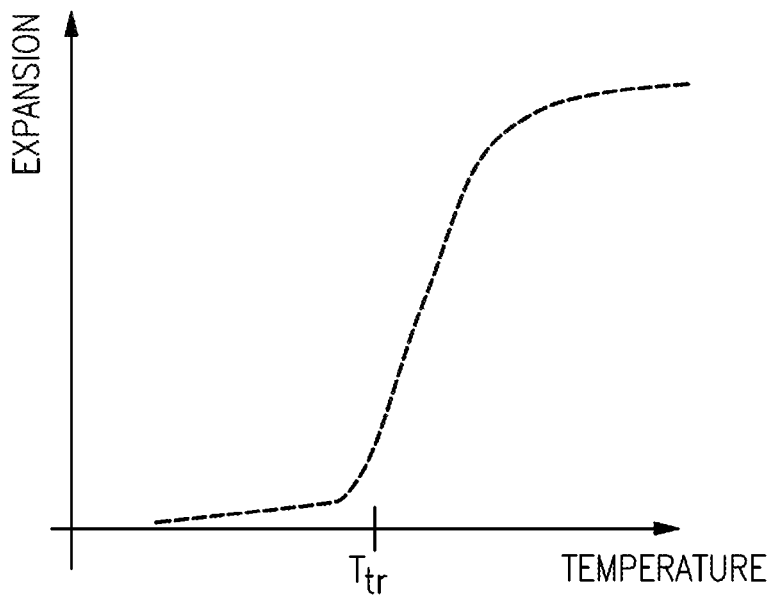
FIG. 6 depicts a graph schematically illustrating the volume of expandable graphite as a function of temperature in several experiments.

FIG. 6 depicts a graph schematically illustrating the volume of expandable graphite as a function of temperature in several experiments. In one illustrative example, the expandable graphite particles can expand up to 200 times comparing to their initial volume when the temperature raises above a triggering temperature value.

The amount of expandable graphite influences the size of the resulting particles after the cracking of the inner tooling (mandrel) In several illustrative examples, the weight fraction of expandable graphite can be at least 2%, 5%, 10% or 15% of the overall mixture weight of dry ingredients prior to addition of water. It has been observed that the characteristic size of mandrel fragments after the mandrel destruction caused by graphite particle expansion decreases as the weight fraction of expandable graphite increases. The maximum weight fraction of the expandable graphite is limited by the viscosity of the resulting mixture, since it has been observed that the mixture viscosity increases with increasing the proportion of expandable graphite, and when the viscosity exceeds some threshold value which in one illustrative example can correspond to 25% weight fraction of expandable graphite in the mixture, the mixture may no longer be used for mandrel fabrication.

Hence, the desired weight fraction of expandable graphite in the material employed for mandrel fabrication can be calculated based on the sizes of openings through which the mandrel fragments need to be removed and/or the desired viscosity of the material.

In a further aspect, a hybrid mandrel can be manufactured having one or more portions made from the above described mixture and one or more portions made from other materials (e.g., metals). In one illustrative example, one or more portions of the mandrel having recessed surface can be made from the above described mixture, while other portions can be made from other materials (e.g., metals). The removal of the portions of the hybrid mandrel can be performed independently from each other. In one illustrative example, upon completion of the composite material curing stage, some portions of the mandrel can be cracked by producing the triggering condition (e.g., by raising the temperature in the working space), while other portions of the mandrel (e.g., those made of materials not containing expandable particles) can be removed intact and re-used.

Figure 7:
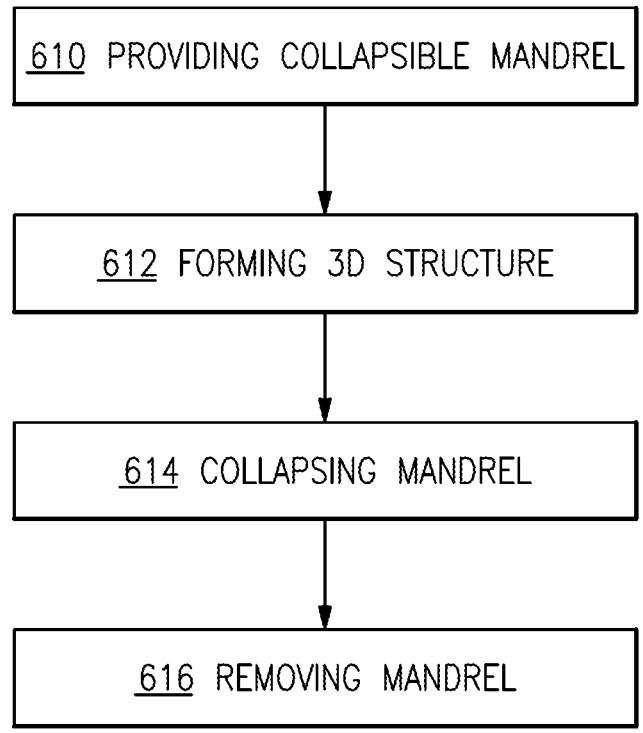
FIG. 7 schematically illustrates a flowchart of one illustrative embodiment of a method of manufacturing a three-dimensional structure from a composite material, in accordance with one or more aspects of this disclosure.

A flowchart of one illustrative embodiment of a method of manufacturing a three-dimensional structure from a composite material using the above described collapsible mandrel is depicted in FIG. 7.

At step 610, a mandrel can be provided, such that the external surface of the mandrel at least partially corresponds to the desired inner surface of the three-dimensional structure being manufactured. The mandrel can include a plurality of expandable particles configured to spatially expand responsive to a triggering condition. In certain embodiments, the mandrel can be made of a material comprising gypsum plaster with the expandable particles incorporated therein. In certain embodiments, the expandable particles can comprise a thermally expandable material, such as thermally expandable graphite. In certain embodiments, the weight fraction of the thermally expandable graphite in the material employed for fabricating the mandrel can be one of: at least 2%, at least 5%, at least 10%, or at least 15%. In certain embodiments, the weight fraction of the expandable particles in the material employed for fabricating the mandrel can be defined based on the sizes of openings within the three-dimensional structure through which one or more fragments of the mandrel need to be removed. In certain embodiments, the weight fraction of the expandable particles in the material employed for mandrel fabrication can be defined based on the desired viscosity of the material.

At step 612, the three-dimensional structure can be formed by depositing the composite material around the mandrel. In certain embodiments, the composite material can comprise a thermally curable resin. In certain embodiments, forming the three-dimensional structure can include curing the composite material. In certain embodiments, forming the three-dimensional structure can include applying a surface sealing material on the surface of the composite material. In one illustrative example, the surface sealing material can be impermeable by the composite material.

At step 614, the mandrel can be cracked inside the three-dimensional structure by causing the triggering condition.

At step 616, the mandrel can be removed from the three-dimensional structure, and the method can terminate.

Due to a wide range of operating temperatures, mandrels made from the above described mixture can advantageously be used in various industries, including, e.g., aviation and automotive industries. Furthermore, the relatively low cost of materials enables using mandrels made from the above described mixture in high volume production facilities.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure. It is to be understood that not necessarily all such objects or advantages described above can be achieved in accordance with any particular embodiment. Thus, for example, those skilled in the art will recognize that the systems and techniques described herein can be embodied or carried out in a manner that achieves or optimizes one advantage or group of advantages as taught herein without necessarily achieving other objects or advantages as can be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the disclosure can include only some of the described embodiments. Accordingly, the invention is not to be seen as limited by the foregoing description, but is only limited by the scope of the appended claims.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A mandrel, said mandrel comprising a plurality of expandable particles configured to expand responsive to a threshold condition, wherein said mandrel is configured to crack responsive to a triggering condition, wherein the triggering condition is related to the expansion of the plurality of expandable particles, wherein the plurality of expandable particles include a variable coefficient of thermal expansion, wherein the coefficient of thermal expansion is below a first threshold value in the absence of the triggering condition; and wherein the coefficient of thermal expansion raises above a second threshold value responsive to the triggering condition.

2. The mandrel of claim 1 wherein the mandrel is made of a material comprising gypsum plaster with the expandable particles incorporated therein.

3. The mandrel of claim 1 comprising:
one or more portions made from a first material including expandable particles configured to spatially expand responsive to the triggering condition; and one or more portions made from a second material which does not include expandable particles.

4. The mandrel of claim 1, wherein the expandable particles comprise thermally expandable graphite.

5. The mandrel according to claim 4, wherein the thermally expandable graphite comprises intercalation agents of sulfur or nitrogen compounds.

6. A method of manufacturing a three-dimensional structure from a composite material, comprising:
 forming the three-dimensional structure by depositing the composite material around at least one surface of the mandrel of claim 1, the at least one surface at least partially corresponding, to at least one desired surface of the three-dimensional structure;
 cracking the mandrel inside the three-dimensional structure by causing a triggering condition by expansion of the plurality of expandable particles; and
 removing at least a portion of the mandrel from the three-dimensional structure.

7. The method of claim 6, wherein forming the three-dimensional structure further comprises applying a surface sealing material on a surface of the composite material, the surface sealing material being impermeable by the composite material.

8. The method of claim 6, further comprising initiating the triggering condition by increasing temperature of the mandrel above a threshold temperature level.

9. The method of claim 6, wherein a weight fraction of the expandable particles in a material employed for fabricating the mandrel is defined based on sizes of openings within the three-dimensional structure through which one or more fragments of the mandrel need to be removed.

10. The method of claim 6, wherein a weight fraction of the expandable particles in a material employed for mandrel fabrication is defined based on a desired viscosity of the material.

11. The method of claim 6, wherein the mandrel comprises one or more portions made from a first material including expandable particles configured to spatially expand responsive to the triggering condition, and one or more portions made from a second material which does not include expandable particles;
 wherein one or more portions made from the first material are configured to be cracked responsive to the triggering condition; and
 wherein one or more portions made from the second material are configured to be removed substantially intact responsive to cracking of the mandrel.

12. A method of manufacturing a three-dimensional structure from a composite material, comprising:
 forming the three-dimensional structure by depositing the composite material around the mandrel of claim 1;
 cracking the mandrel inside the three-dimensional structure with the plurality of expandable particles by causing the triggering condition; and
 removing at least a portion of the mandrel from the three-dimensional structure.

13. The mandrel of claim 1, wherein the mandrel is made of a material comprising gypsum plaster with the plurality of expandable particles incorporated therein and the plurality of expandable particles comprise thermally expandable graphite comprising intercalation agents of sulfur or nitrogen compounds.

14. The mandrel of claim 13, wherein a weight fraction of the thermally expandable graphite in the gypsum plaster is between 2% and least 15%.

15. The mandrel of claim 13 wherein a weight fraction of the thermally expandable graphite in the gypsum plaster is at least 15%.

16. The mandrel of claim 1, wherein the triggering condition is initiated by increasing temperature of the mandrel equal to or above a threshold temperature level of the threshold condition.

17. The mandrel of claim 1, wherein the triggering condition is initiated by light, microwave, energy or chemical reaction.

18. The mandrel of claim 1, wherein the first threshold value of the coefficient of thermal expansion is $25*10^{-6}/K$ and the second threshold value of the coefficient of thermal expansion is $30*10^{-6}/K$.

19. The mandrel of claim 18, wherein the triggering condition is an increase in temperature above a triggering temperature.

20. A mandrel comprising:
 a plurality of expandable particles configured to expand responsive to a threshold condition, wherein said mandrel is configured to crack responsive to a triggering condition related to the expansion of the plurality of expandable particles, the plurality of expandable particles having a variable coefficient of thermal expansion, the coefficient of thermal expansion being below a first threshold value in the absence of the triggering condition and the coefficient of thermal expansion being above a second threshold value responsive to the triggering condition, the mandrel being made of a material comprising gypsum plaster with the plurality of expandable particles incorporated therein and the plurality of expandable particles comprising thermally expandable graphite comprising intercalation agents of sulfur or nitrogen compounds, a weight fraction of the thermally expandable graphite in the gypsum plaster is at least 2%, and the first threshold value of the coefficient of thermal expansion is $25*10^{-6}/K$ and the second threshold value of the coefficient of thermal expansion is $30*10^{-6}/K$.

* * * * *